US012046858B2

(12) United States Patent
Martin

(10) Patent No.: US 12,046,858 B2
(45) Date of Patent: Jul. 23, 2024

(54) ELECTRICAL CONTACT POSITION ASSURANCE FOR ELECTRICAL CONNECTOR SYSTEM

(71) Applicant: TE Connectivity Services GmbH, Schaffhausen (CH)

(72) Inventor: Galen M. Martin, Mechanicsburg, PA (US)

(73) Assignee: TE Connectivity Solutions GmbH (CH)

( * ) Notice: Subject to any disclaimer, the term of this patent is extended or adjusted under 35 U.S.C. 154(b) by 349 days.

(21) Appl. No.: 17/675,094

(22) Filed: Feb. 18, 2022

(65) Prior Publication Data

US 2023/0268697 A1 Aug. 24, 2023

(51) Int. Cl.

| | |
|---|---|
| ***H01R 13/71*** | (2006.01) |
| ***H01R 12/71*** | (2011.01) |
| ***H01R 13/627*** | (2006.01) |
| ***H01R 13/639*** | (2006.01) |

(52) U.S. Cl.

CPC ........... *H01R 13/71* (2013.01); *H01R 12/716* (2013.01); *H01R 13/6272* (2013.01); *H01R 13/639* (2013.01)

(58) Field of Classification Search

CPC .. H01R 13/71; H01R 12/716; H01R 13/6272; H01R 13/639; H01R 13/5219; H01R 13/701; H01R 13/7032; H01R 13/641; H01R 13/02; H01R 13/42; H01R 13/502; H01R 13/5202

See application file for complete search history.

(56) References Cited

U.S. PATENT DOCUMENTS

| | | | | |
|---|---|---|---|---|
| 10,833,450 B2* | 11/2020 | Mase | H01R 13/639 |
| 2014/0106601 A1* | 4/2014 | Matsumoto | H01R 13/62 439/352 |
| 2017/0271815 A1* | 9/2017 | Lane | H01R 13/6272 |
| 2023/0268696 A1* | 8/2023 | Martin | H01R 13/5202 439/188 |

* cited by examiner

*Primary Examiner* — Travis S Chambers

(57) ABSTRACT

A plug connector includes a plug housing configured to be coupled to a header connector. The plug housing holds plug contacts configured to be mated with corresponding header contacts. The plug connector includes an eCPA assembly coupled to the plug housing having an actuator movable between a retracted position and an actuated position and holding a shorting terminal movable by the actuator between a mated position and an unmated position. The shorting terminal is coupled to fixed terminals in the mated position to form a position assurance circuit in the mated position.

20 Claims, 8 Drawing Sheets

ELECTRICAL CONTACT POSITION ASSURANCE FOR ELECTRICAL CONNECTOR SYSTEM

BACKGROUND OF THE INVENTION

The subject matter herein relates generally to electrical connector systems.

Electrical connector systems use electrical connectors to electrically connect various components within a system, such as a vehicle. For example, a plug connector may be mated with a header connector. Each connector holds contacts that are mated when the plug connector is coupled to the header connector. If the connectors are only partially mated, the electrical connectors may work intermittently or not at all. Additionally, with power connectors, partial connection of the connectors could lead to damage, such as due to short circuiting or electrical arcing. It is desirable in some systems to provide assurance that the connectors are fully mated and that the connectors remain fully mated during use of the system.

BRIEF DESCRIPTION OF THE INVENTION

In one embodiment, a plug connector is provided and includes a plug housing extending between a front and a rear of the plug housing. The plug housing includes a cavity. The plug housing is configured to be coupled to a header connector. The plug housing includes a mating end configured to be plugged into a header chamber of the header connector. The plug connector includes plug contacts held by the plug housing. The plug contacts are configured to be mated with corresponding header contacts of the header connector. The plug connector includes an electrical connector position assurance (eCPA) assembly coupled to the plug housing. The eCPA includes an actuator movably coupled to the plug housing. The actuator is movable between a retracted position and an actuated position. The eCPA includes a shorting terminal coupled to the actuator and movable by the actuator between a mated position and an unmated position. The shorting terminal includes a first interface configured to be coupled to a first fixed terminal in the mated position and a second interface configured to be coupled to a second fixed terminal in the mated position. The shorting terminal is movable between the unmated position and the mated position as the actuator moves between the retracted position and the actuated position. The shorting terminal forms a position assurance circuit in the mated position when the first and second interfaces are coupled to the first and second fixed terminals.

In another embodiment, a plug connector is provided and includes a plug housing extending between a front and a rear of the plug housing. The plug housing includes a cavity. The plug housing is configured to be coupled to a header connector. The plug housing includes a mating end configured to be plugged into a header chamber of the header connector. The plug connector includes a plug seal coupled to the plug housing. The plug seal is configured to interface with the header connector to provide environmental sealing between the plug housing and the header connector. The plug connector includes plug contacts held by the plug housing. The plug contacts are configured to be mated with corresponding header contacts of the header connector. The plug connector includes an electrical connector position assurance (eCPA) assembly coupled to the plug housing. The eCPA includes an actuator, a shorting terminal, and an eCPA seal. The actuator movably coupled to the plug housing. The actuator movable between a retracted position and an actuated position. The shorting terminal is coupled to the actuator and is movable by the actuator between a mated position and an unmated position. The shorting terminal includes a first interface configured to be coupled to a first fixed terminal in the mated position and a second interface configured to be coupled to a second fixed terminal in the mated position. The shorting terminal is movable between the unmated position and the mated position as the actuator moves between the retracted position and the actuated position. The shorting terminal forms a position assurance circuit in the mated position when the first and second interfaces are coupled to the first and second fixed terminals. The eCPA seal is coupled to the actuator. The eCPA seal provides sealing between the actuator and the plug housing.

In a further embodiment, an electrical connector system is provided and includes a header connector including a header housing and header contacts held by the header housing. The header housing has a base and a shroud extending from the base. The shroud surrounds a shroud chamber. The header contacts are coupled to the base and extending into the shroud chamber. The electrical connector system includes a plug connector including a plug housing extending between a front and a rear of the plug housing. The plug housing includes a cavity. The plug housing includes a mating end plugged into the header chamber of the header connector. The plug connector includes plug contacts held by the plug housing and extending into the cavity. The plug contacts are mated with corresponding header contacts of the header connector. The electrical connector system includes an electrical connector position assurance (eCPA) assembly operably coupled to the header connector and the plug connector. The eCPA includes a first fixed terminal in the shroud chamber and a second fixed terminal in the shroud chamber. The eCPA includes an actuator movably coupled to the plug housing. The actuator is movable between a retracted position and an actuated position. The eCPA includes a shorting terminal coupled to the actuator and movable by the actuator between a mated position and an unmated position. The shorting terminal includes a first interface configured to be coupled to the first fixed terminal in the mated position and a second interface configured to be coupled to the second fixed terminal in the mated position. The shorting terminal is movable between the unmated position and the mated position as the actuator moves between the retracted position and the actuated position. The shorting terminal forms a position assurance circuit in the mated position when the first and second interfaces are coupled to the first and second fixed terminals.

DETAILED DESCRIPTION OF THE INVENTION

Figure 1:
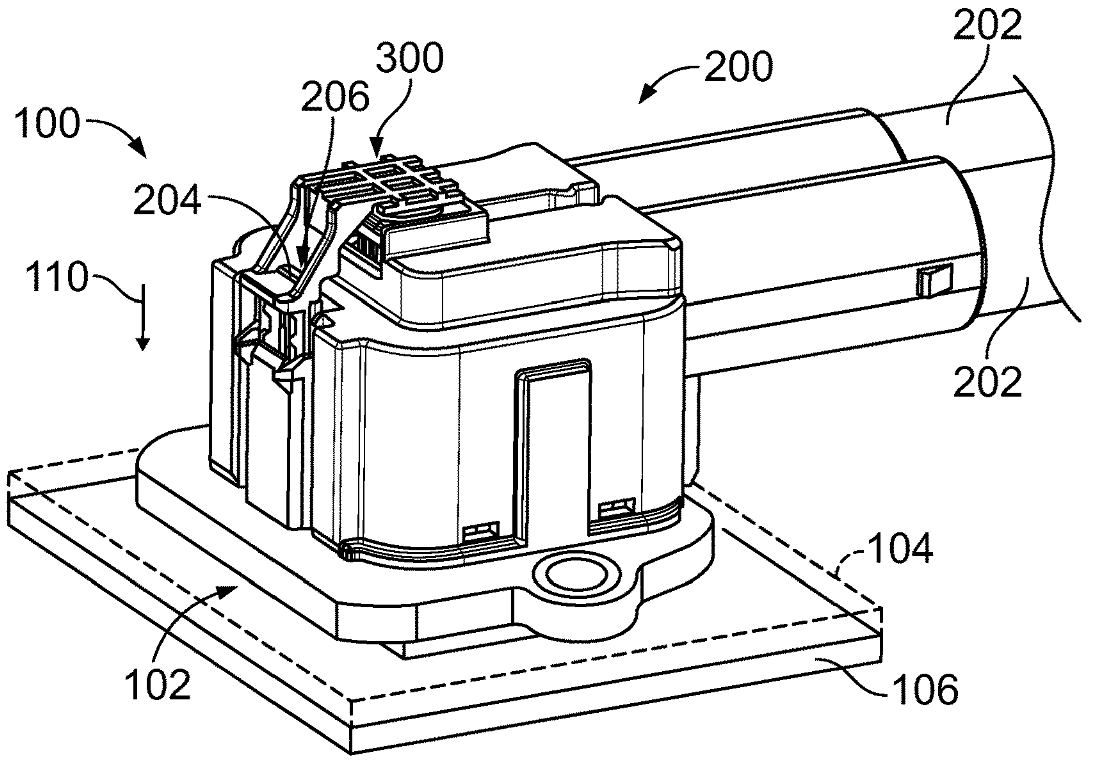
FIG. 1 is a top perspective view of an electrical connector system in accordance with an exemplary embodiment in a mated state.
Figure 2:
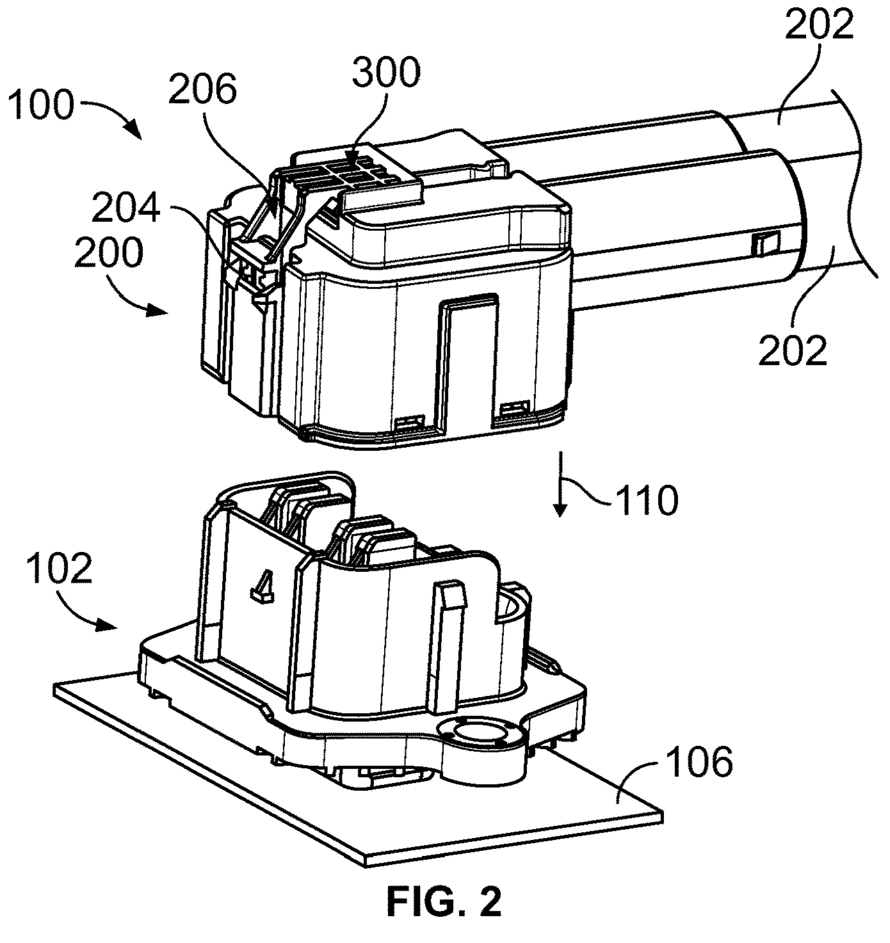
FIG. 2 is a perspective view of the electrical connector system in accordance with an exemplary embodiment in an unmated state.
Figure 3:
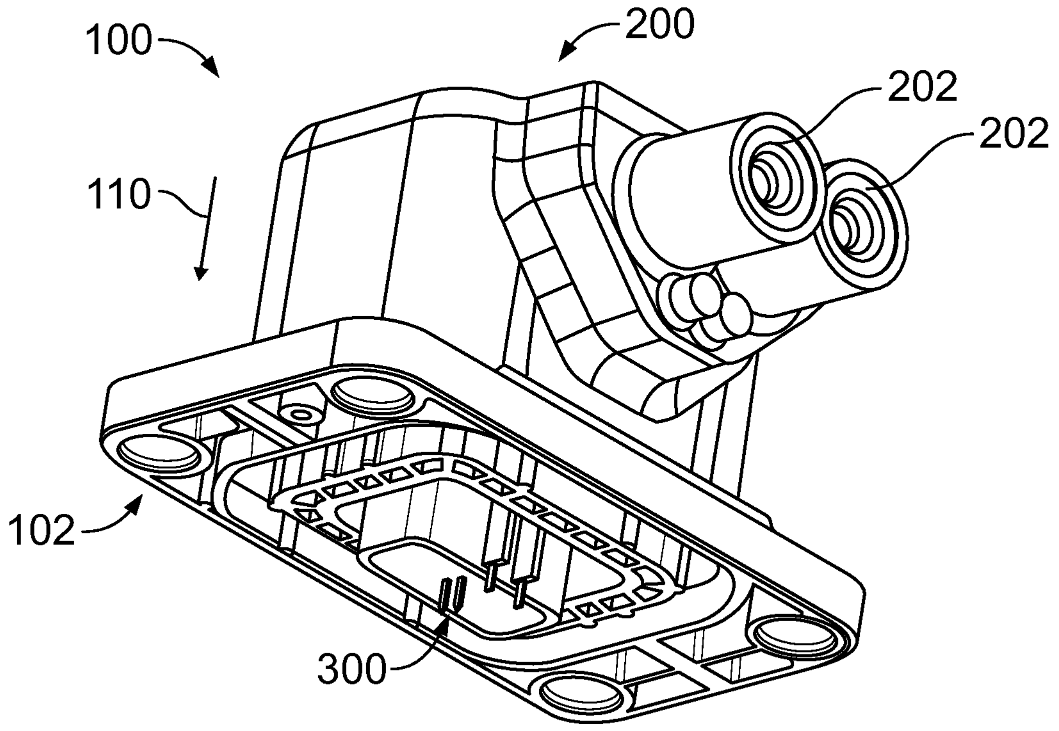
FIG. 3 is a bottom perspective view of the electrical connector system in accordance with an exemplary embodiment.

FIG. 1 is a top perspective view of an electrical connector system 100 in accordance with an exemplary embodiment in a mated state. FIG. 2 is a perspective view of the electrical connector system 100 in accordance with an exemplary embodiment in an unmated state. FIG. 3 is a bottom perspective view of the electrical connector system 100 in accordance with an exemplary embodiment. The electrical connector system 100 includes a header connector 102 and a plug connector 200 removably coupled to the header connector 102.

In an exemplary embodiment, the electrical connector system 100 includes an electrical connector position assurance (eCPA) assembly 300 operable to electrically assure or guarantee that the connectors 102, 200 are fully mated and properly latched together. In an exemplary embodiment, the eCPA assembly 300 is a sealed assembly providing a sealed interface for the connectors. For example, the electrical components of the eCPA assembly 300 are contained within a sealed environment.

The electrical connector system 100 may be used within a harsh environment, such as within a vehicle. The electrical connector system 100 may be exposed to moisture, dirt, debris, vibration, shock, and the like. In an exemplary embodiment, the header connector 102 is mounted to the vehicle, such as to a chassis or frame of the vehicle. The header connector 102 may be mounted to a component of the vehicle, such as the battery module or other electrical component of the vehicle. For example, the header connector 102 is mechanically mounted to a housing 104 (shown in phantom in FIG. 1) or other structure. The header connector 102 may be electrically connected to an electrical component of the vehicle, such as the battery module. For example, the header connector 102 may be electrically connected to a circuit board 106 located within the housing 104. The header connector 102 may transmit data and/or power to or from the circuit board 106. In alternative embodiments, the header connector 102 may be a cable connector rather than a board connector. For example, the header connector 102 may be provided at ends of cables (not shown).

The plug connector 200 is removably coupled to the header connector 102. The plug connector 200 is configured to be mated to the header connector 102 in a mating direction 110 (for example, a vertical direction). In an exemplary embodiment, the plug connector 200 is a cable connector. For example, the plug connector 200 is terminated to ends of cables 202. The cables 202 extend from the plug connector 200 and are routed to another component or area of the vehicle.

In an exemplary embodiment, the plug connector 200 includes a latch 204 for latchably coupling the plug connector 200 to the header connector 102. The latch 204 prevents inadvertent unmating of the plug connector 200 from the header connector 102. The latch 204 may be unlatched by an operator to unmate the plug connector 200 from the header connector 102. For example, the latch 204 may be movable between a latched position and an unlatched position. The latch 204 may be rotated or pivoted to the unlatched position, such as by pressing against an actuation end 206 of the latch 204. In an exemplary embodiment, the eCPA assembly 300 is configured to be operably coupled to the latch 204. The eCPA assembly 300 is used as a secondary lock for the latch 204. The eCPA assembly 300 may be used to back up the latch 204 and prevent the latch 204 from moving to the unlatched position when the eCPA assembly 300 is engaged. In various embodiments, the eCPA assembly 300 may only be engaged with the latch 204 when the plug connector 200 is in the latched position. As such, the eCPA assembly 300 ensures that the plug connector 200 is fully mated and remains mated at all times while the eCPA assembly 300 is engaged.

The eCPA assembly 300 creates a position assurance circuit that is only activated when the latch 204 is in the latched position and the eCPA assembly 300 is actuated. For example, the position assurance circuit may be a normally open circuit and the position assurance circuit is closed or made when the eCPA assembly 300 is actuated. In other embodiments, the position assurance circuit may be a normally closed circuit and the position assurance circuit is open or short circuited when the eCPA assembly 300 is actuated. The operation of the electrical connector system 100 may be controlled by the eCPA assembly 300. For example, power or signals may not be transmitted through the electrical connector system 100 unless and until the position assurance circuit is closed (or opened depending on the particular arrangement). As such, normal operation of the electrical connector system 100 only occurs when the plug connector 200 is fully mated with the header connector 102.

Figure 4:
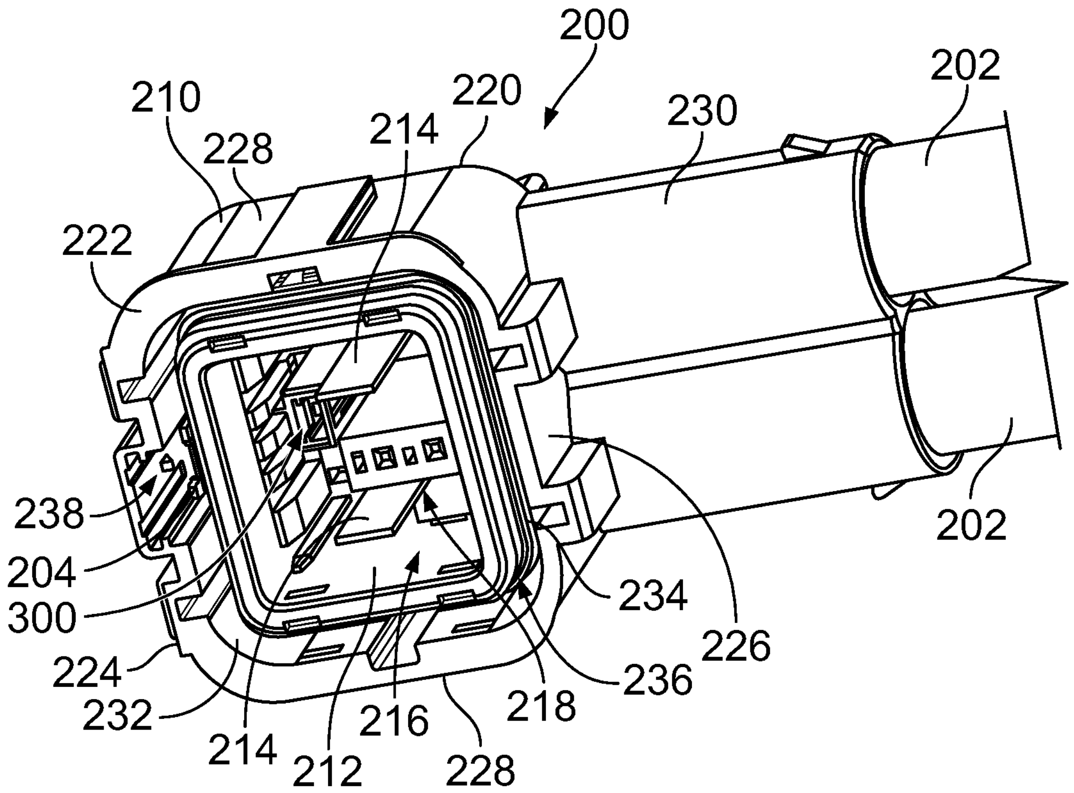
FIG. 4 is a perspective view of the plug connector in accordance with an exemplary embodiment.

FIG. 4 is a perspective view of the plug connector 200 in accordance with an exemplary embodiment. The plug connector 200 includes a plug housing 210 holding plug contacts 214. In an exemplary embodiment, the plug contacts 214 are planar blade contacts. However, other types of contacts may be used in alternative embodiments, such as sockets, pins, spring contacts, beam contacts, or other types of contacts. The cables 202 are coupled to the plug contacts 214 and extend from the plug housing 210 to a remote component. The latch 204 extends from the plug housing 210. The latch 204 may be integral with the plug housing 210. The eCPA assembly 300 is coupled to the plug housing 210.

The plug housing 210 may be manufactured from a dielectric material, such as a plastic material. The plug housing 210 may be a molded part. The plug housing 210 includes a mating end 211 configured to be plugged into the header connector 102. In an exemplary embodiment, the plug housing 210 includes a plug insert 212 defining the mating end 211, which is configured to be plugged into the header connector 102. The plug insert 212 may be integral with the plug housing 210, such as being molded with the plug housing 210. In other embodiments, the plug insert 212 may be separate from the plug housing 210 and coupled to the plug housing 210. In alternative embodiments, the plug housing 210 may be provided without a plug insert 212. In an exemplary embodiment, the plug housing 210 includes a cavity 216, which is configured to receive a portion of the header connector 102. The plug insert 212 holds the plug contacts 214, such as in contact channels 218. The plug contacts 214 extend into the cavity 216 for mating with the header connector 102.

The plug housing 210 extends between a top 220 and a bottom 222. The plug housing 210 includes a front 224 and a rear 226. The plug housing 210 includes sides 228 extending between the front 224 and the rear 226. In the illustrated embodiment, the latch 204 is provided at the front 224. Other locations are possible in alternative embodiments, such as at one or both of the sides 228. In the illustrated embodiment, the cables 202 extend from the rear 226, such as through cable bores passing through a cable ferrule 230 at the rear 226. Other locations are possible in alternative embodiments, such as the top 220. In an exemplary embodiment, the bottom 222 defines a mating end of the plug connector 200. The cavity 216 is open at the bottom 222 to receive the header connector 102.

In an exemplary embodiment, the plug housing 210 includes an outer wall 232 that surrounds the plug insert 212. The outer wall 232 may be generally box shaped. In an exemplary embodiment, an environmental seal 234 is received in a seal pocket 236 between the outer wall 232 and the plug insert 212. The seal 234 is configured to be sealed to the outer wall 232 and/or the plug insert 212 and is configured to be sealed to the header connector 102. The seal 234 provides environmental sealing at the interface between the plug connector 200 and the header connector 102, such as to prevent moisture or debris from entering the cavity 216.

In an exemplary embodiment, the plug housing 210 includes a latch pocket 238 at the front 224. The latch 204 is located in the latch pocket 238. In an exemplary embodiment, a portion of the eCPA 300 extends into the latch pocket 238. The latch pocket 238 may be open at the bottom 222, such as to receive a latching portion of the header connector 102.

Figure 5:
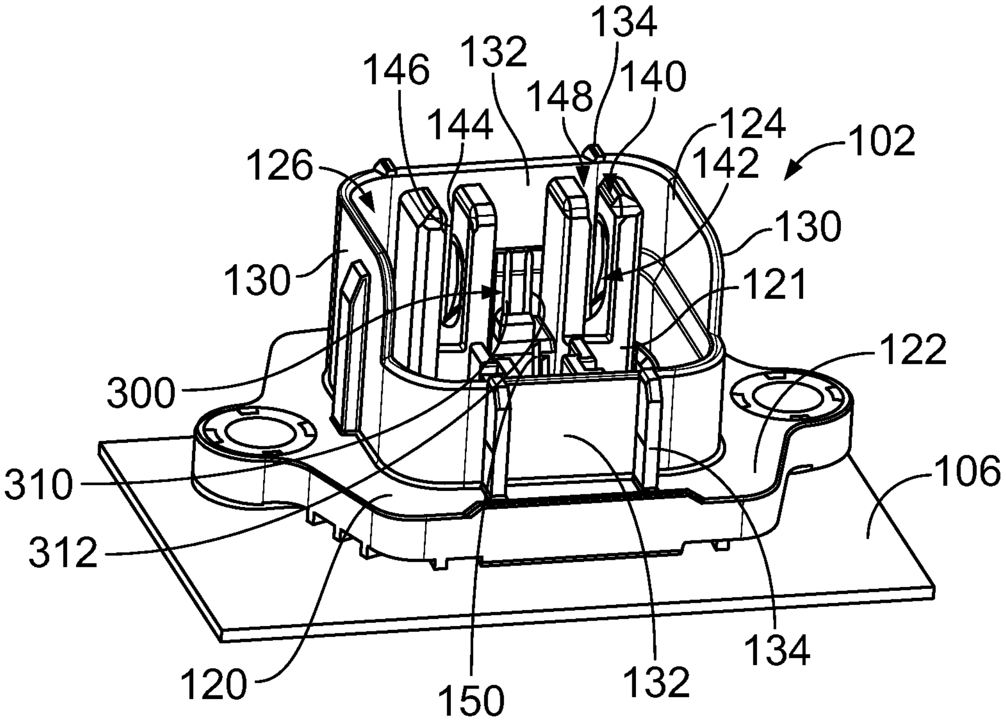
FIG. 5 is a top perspective view of the header connector in accordance with an exemplary embodiment.
Figure 6:
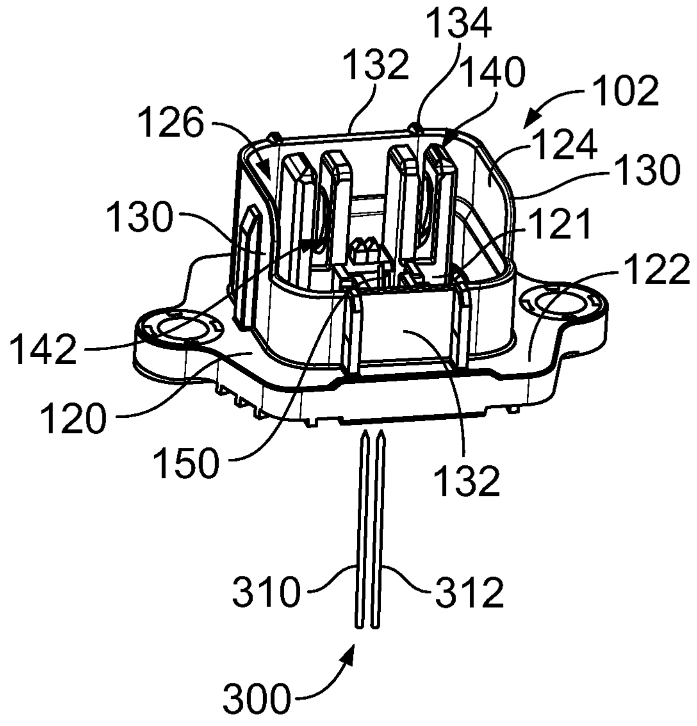
FIG. 6 is an exploded view of the header connector in accordance with an exemplary embodiment.

FIG. 5 is a top perspective view of the header connector 102 in accordance with an exemplary embodiment. FIG. 6 is an exploded view of the header connector 102 in accordance with an exemplary embodiment. The header connector 102 is shown mounted to the housing 104 and electrically connected to the circuit board 106 located within the housing 104. The header connector 102 transmits data and/or power to or from the circuit board 106.

The header connector 102 includes a header housing 120 holding header contacts 140. The header housing 120 includes a base 122 at a bottom of the header connector 102 and a shroud 124 extending from the base 122 to a top of the header connector 102. The shroud 124 surrounds a shroud chamber 126. The shroud chamber 126 is open at the top to receive a portion of the plug connector 200.

In an exemplary embodiment, the header housing 120 includes a header insert 121 holding the header contacts 140. The header insert 121 and the header contacts 140 extend into the shroud chamber 126. In various embodiments, the header insert 121 is separate and discrete from the base 122 and the shroud 124. The header insert 121 is received in an opening in the base 122 to support the header contacts 140 relative to the base 122. In other embodiments, the header insert 121 may be integral with the base 122, such as being co-molded with the base 122. In alternative embodiments, the header housing 120 may be provided without the header insert 121. For example, the base 122 may hold the header contacts 140.

In an exemplary embodiment, the shroud 124 includes side walls 130 and end walls 132 between the side walls 130, such as at a front and a rear of the header connector 102. Optionally, one of the end walls 132 is taller while the other end wall 132 is shorter and the side walls 130 may transition between the taller and shorter end walls 132. The shorter end wall 132 is provided to allow a portion of the plug connector 200, such as the plug contacts 214, to exit the shroud chamber 126. However, all of the walls may have the same height in other embodiments. In various embodiments, the corners between the side walls 130 and the end walls 132 are curved.

In an exemplary embodiment, the shroud 124 includes guide features 134 to guide mating with the plug connector 200. The guide features 134 may orient the plug connector 200 relative to the header connector 102. In the illustrated embodiment, the guide features 134 are tabs or wings extending from one or more of the walls of the shroud 124. For example, the guide features 134 may be provided at the front and rear of the header connector 102. The guide features 134 may be keyed, such as being offset, to orient the plug connector 200 relative to the header connector 102. The guide features 134 may be provided at other locations in alternative embodiments. Other types of guide features may be used in alternative embodiments.

In an exemplary embodiment, the header contacts 140 are held in the header insert 121. The header contacts 140 may be loaded into the header insert 121 through the bottom of the header insert 121. In an exemplary embodiment, the header contacts 140 are socket contacts. For example, the header contacts 140 have a socket 142 defined between contact arms 144, 146. The header contacts 140 may be arranged in a contact stack. In an exemplary embodiment, the header insert 121 includes a slot 148 aligned with the socket 142 to receive the plug contact 214. The mating ends of the header contacts 140 are exposed in the slot 148 to mate with the plug contact 214. The opposite ends of the header contacts 140 are terminated to the circuit board 106 (or a wire or cable). Other types of contacts may be used in alternative embodiments, such as pins, blades, spring beam contacts, tuning fork contacts, or other types of contacts. The header contacts 140 may be signal contacts, power contacts, ground contacts, or other types of contacts.

In an exemplary embodiment, the header connector 102 includes signal contacts 150 coupled to the header insert 121 or the header housing 120. In various embodiments, the signal contacts 150 are pilot contacts configured to form a pilot circuit. The signal contacts 150 are configured to be mated after the header contacts 140 are mated to the plug contacts 214 and are configured to be unmated prior to the header contacts 140 be unmated from the plug contacts 214. The pilot circuit may restrict transmission along the header contacts 140 when the signal contacts 150 are unmated. As such, power may be restricted from transmission through the header contacts 140 until the signal contacts 150 are mated and the power is restricted as soon as the signal contacts 150 are unmated. Other types of contacts may be provided in alternative embodiments.

In an exemplary embodiment, a portion of the eCPA assembly 300 is provided in the header connector 102. For example, a first fixed terminal 310 and a second fixed terminal 312 of the eCPA assembly 300 is provided in the header connector 102. The fixed terminals 310, 312 form part of a position assurance circuit that provides an electrical guarantee that the plug connector 200 is fully mated with the header connector 102. The fixed terminals 310, 312 may be terminated to the circuit board 106 (or wires or cables). The fixed terminals 310, 312 extend into the shroud chamber 126. Optionally, the fixed terminals 310, 312 may be coupled to the header insert 121. For example, the fixed terminals 310, 312 may extend along the exterior of the header insert 121. The header insert 121 support the fixed terminals 310, 312. The fixed terminals 310, 312 may include pins at the mating end. However, fixed terminals 310, 312 may be other types of terminals in alternative embodiments.

Figure 7:
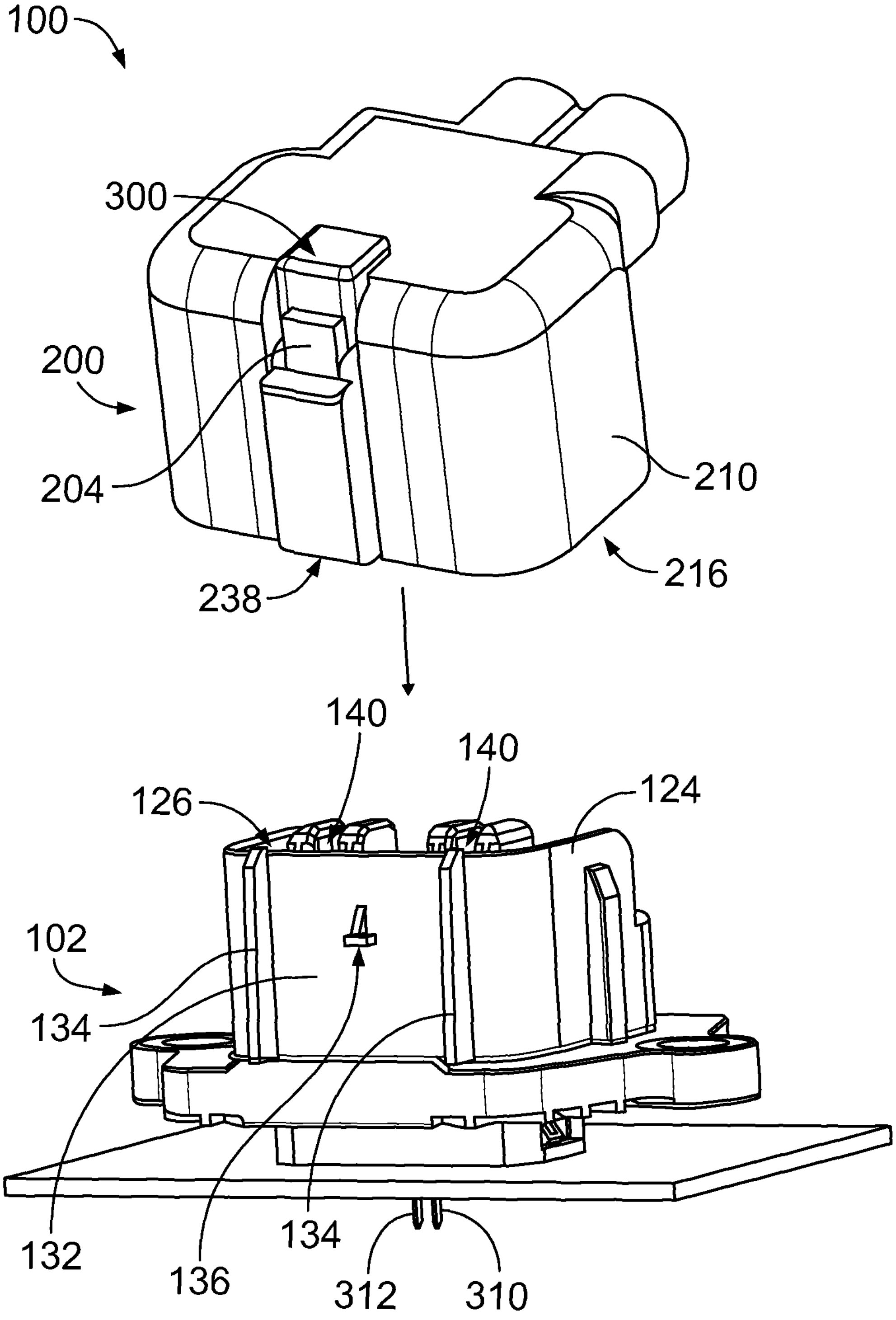
FIG. 7 is a front perspective view of the electrical connector system showing the plug connector poised for mated with the header connector in accordance with an exemplary embodiment.

FIG. 7 is a front perspective view of the electrical connector system 100 showing the plug connector 200 poised for mated with the header connector 102. During mating, the plug connector 200 is aligned with the header connector 102. The plug insert 212 (shown in FIG. 4) is configured to be plugged into the shroud chamber 126. The plug housing 210 is configured to surround the shroud 124. For example, the shroud 124 may be plugged into the cavity 216 during mating. The guide features 134 are used to orient the plug connector 200 relative to the header connector 102 and guide mating of the plug connector 200 with the header connector 102. During mating, the plug contacts 214 (shown in FIG. 4) are configured to be mated with the header contacts 140. The eCPA assembly 300 is configured to be mated with the fixed terminals 310, 312.

In an exemplary embodiment, the shroud 124 includes a latching feature 136 used for latchably coupling the plug connector 200 with the header connector 102. The latching feature 136 is configured to be coupled to the latch 204 of the plug connector 200 to securely couple the plug connector 200 to the header connector 102. The latching feature 136 may be received in the latch pocket 238 as the plug connector 200 is mated onto the header connector 102. The latch 204 interfaces with the latching feature 136 in the latch pocket 238. In the illustrated embodiment, the latching feature 136 includes a ramp-shaped protrusion extending from the exterior of the front end wall 132. Other types of latching features may be used in alternative embodiments.

The eCPA assembly 300 is operably coupled to the plug connector 200 and the header connector 102. For example, some of the components of the eCPA assembly 300 may be coupled to the plug connector 200 and some of the components of the eCPA assembly 300 may be coupled to the header connector 102. Various components of the eCPA assembly 300 may be electrically connected together during mating of the plug connector 200 with the header connector 102 to form a position assurance circuit that provides an electrical guarantee that the plug connector 200 is fully mated with the header connector 102, such as to allow operation and use of the electrical connector system 100.

Figure 8:
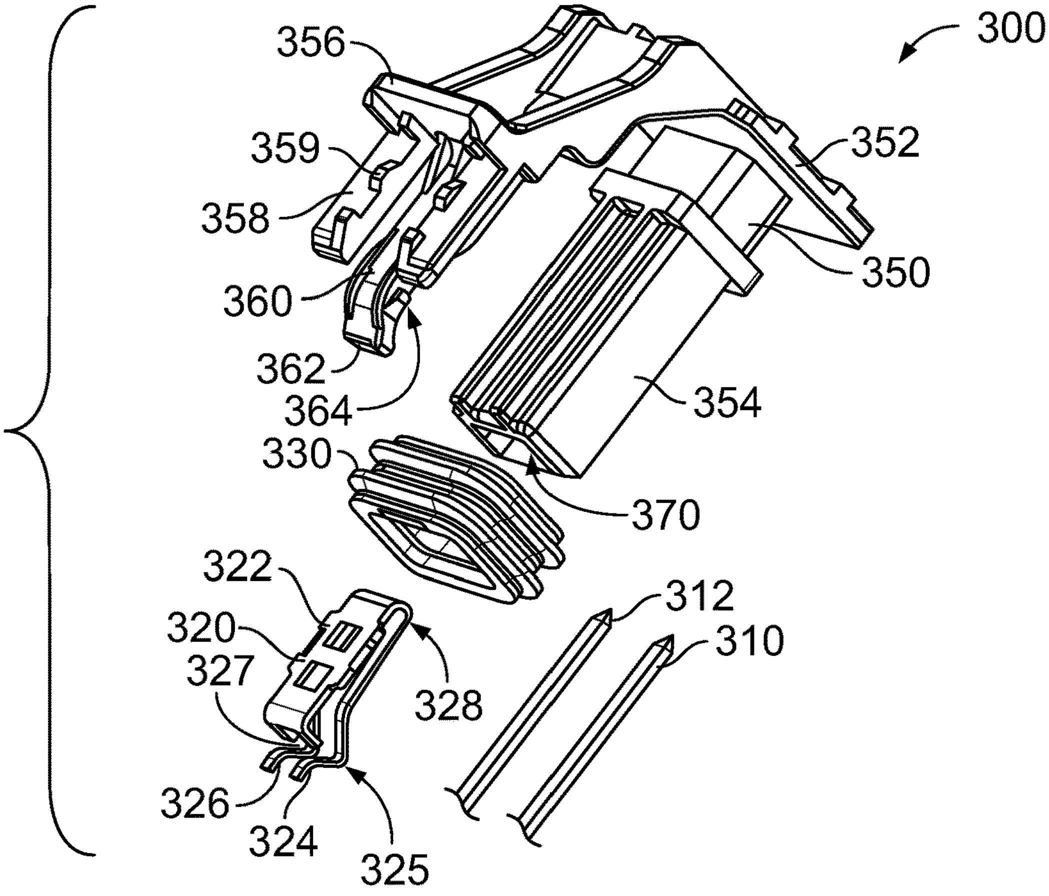
FIG. 8 is a front perspective, exploded view of the eCPA assembly in accordance with an exemplary embodiment.
Figure 9:
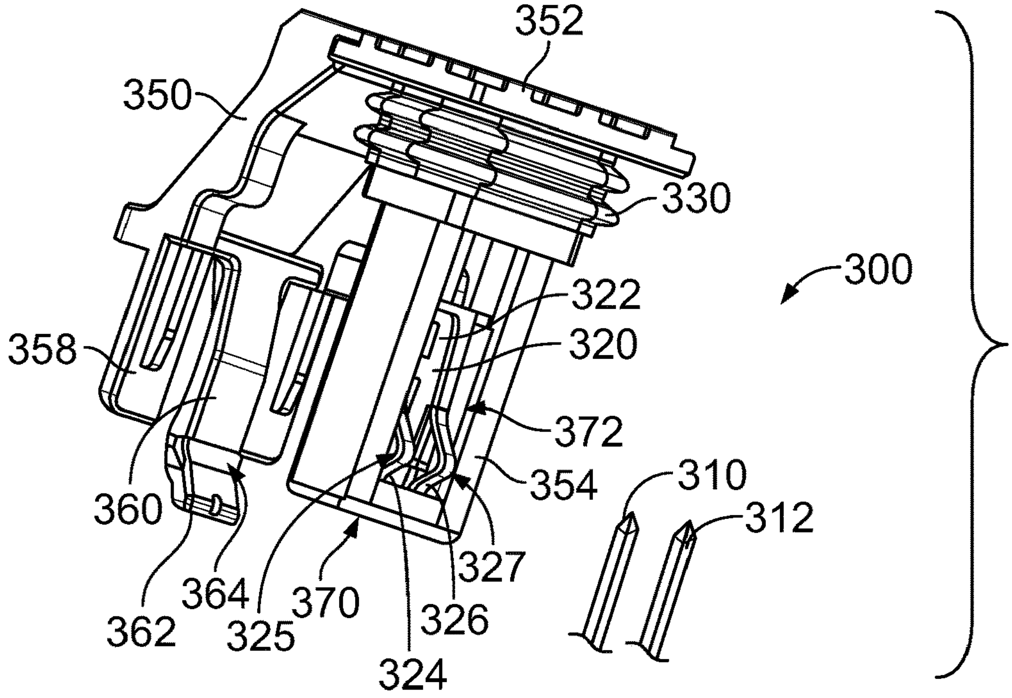
FIG. 9 is a rear perspective view of the eCPA assembly in accordance with an exemplary embodiment.

FIG. 8 is a front perspective, exploded view of the eCPA assembly 300 in accordance with an exemplary embodiment. FIG. 9 is a rear perspective view of the eCPA assembly 300 in accordance with an exemplary embodiment in an assembled state. In an exemplary embodiment, the eCPA assembly 300 includes the first fixed terminal 310, the second fixed terminal 312, a shorting terminal 320, an actuator 350, and a seal 330. The actuator 350 holds the seal 330. The actuator 350 holds the shorting terminal 320. The shorting terminal 320 is configured to be electrically connected to the first and second fixed terminals 310, 312 to form the position assurance circuit to provide an electrical guarantee that the plug connector 200 is fully mated with the header connector 102.

In an exemplary embodiment, the shorting terminal 320 is a stamped and formed terminal. The shorting terminal 320 includes a main body 322 and mating arms 324, 326 extending from the main body 322. The mating arms 324, 326 include mating interfaces configured to engage the first and second fixed terminals 310, 312. The mating arms 324, 326 may be deflectable. The mating arms 324, 326 may be compressible, such as to be spring biased against the fixed terminals 310, 312 to maintain electrical contact with the fixed terminals 310, 312. For example, the mating arms 324, 326 may include spring portions 325, 327 at the mating interfaces. The spring portions 325, 327 may be protrusions, such as V-shaped protrusions. The spring portions 325, 327 are deflectable. Optionally, the main body 322 may include a spring portion 328 that is flexible and configured to be flexed or deflected when the mating arms 324, 326 engage the fixed terminals 310, 312, such as to induce spring pressure of the mating arms 324, 326 against the fixed terminals 310, 312 to maintain electrical contact with the fixed terminals 310, 312. For example, the main body 322 may be folded over at the spring portion 328 such that the shorting terminal 320 is generally U-shaped with the mating arms 324, 326 extending generally parallel to the main body 322. The shorting terminal 320 may have other shapes or features in alternative embodiments.

In an exemplary embodiment, the shorting terminal 320 is coupled to the actuator 350 and is movable with the actuator 350. The shorting terminal 320 is configured to be electrically connected to the first and second fixed terminals 310, 312 when the actuator 350 is moved to an actuated position. For example, only when the actuator 350 is moved to the actuated position does the shorting terminal 320 electrically connect to the first and second fixed terminals 310, 312. The position assurance circuit is closed when the shorting terminal 320 is electrically connected to the first and second fixed terminals 310, 312.

The actuator 350 includes a main body 352, such as at a top of the actuator 350. The actuator 350 includes a stuffer 354 extending from the main body 352. The actuator 350 includes a handle 356 extending from the main body 352. The handle 356 may be pushed or pulled to move the actuator 350. In various embodiments, the top of the main body 352 may be pushed by the operator to move the actuator 350. The actuator 350 includes coupling tabs 358 extending from the main body 352. The actuator 350 includes a blocking arm 360 extending from the main body 352.

In an exemplary embodiment, the blocking arm 360 is located generally at a bottom of the actuator 350. The blocking arm 360 is used for blocking the latch 204 (shown in FIG. 4) to retain the latch 204 in the latched position. For example, the blocking arm 360 is used to lock the latch 204 in the latched position. The blocking arm 360 prevents inadvertent unlatching of the latch 204. The blocking arm 360 extends to a distal end 362. The distal end 362 is configured to engage the latch 204 to position the actuator 350 relative to the latch 204. The blocking arm 360 includes a latch pocket 364 proximate to the distal end 362. The latch pocket 364 is configured to receive the latch 204 in the actuated position. In an exemplary embodiment, the blocking arm 360 is deflectable. The blocking arm 360 is movable between a blocking position and an unblocking position. The blocking arm 360 is configured to block the latch 204 in the blocking position and restrict the latch 204 from unlatching. The latch 204 is able to be unlatched when the blocking arm 360 is in the unblocking position.

In an exemplary embodiment, the coupling tabs 358 are located generally at a bottom of the actuator 350. The coupling tabs 358 are used to couple the actuator 350 to the plug housing 210. For example, the coupling tabs 358 may be received in the latch pocket 238 (shown in FIG. 4). The coupling tabs 358 may be movable within the latch pocket 238. In various embodiments, the coupling tabs 358 include locating tabs 359 configured to engage the plug housing 210 and locate the actuator 350 relative to the plug housing 210. The locating tabs 359 may be bumps or protrusions.

The handle 356 is located at a front of the actuator 350. The handle 356 is configured to be operated by the operator to move the actuator 350 between the actuated position and the retracted position. For example, the handle 356 may include surfaces that are pushed against by the operator to move the actuator 350, such as upward or downward. In various embodiments, may include gripping surfaces or gripping features that may be gripped by the operator to push or pull on the handle 356 to move the actuator 350.

The stuffer 354 is located at a rear of the actuator 350. The stuffer 354 extends downward form the main body 352 to a bottom of the actuator 350. The stuffer 354 is configured to be plugged into the plug housing 210. The stuffer 354 is configured to be located in the cavity 216 (shown in FIG. 4). In the illustrated embodiment, the stuffer 354 is oval shaped. However, the stuffer 354 may have other shapes in alternative embodiments, such as being rectangular, cylindrical, or have another shape. The seal 330 is configured to be coupled to the exterior surface of the stuffer 354. The seal 330 is configured to be sealing coupled to the stuffer 354. In an exemplary embodiment, the stuffer 354 includes a pocket 370 that receives the shorting terminal 320. The pocket 370 may be open at the bottom to receive the shorting terminal 320 through the open bottom. The stuffer 354 may include a window 372 through a side of the stuffer 354. The mating arms 324, 326 of the shorting terminal 320 are configured to extend through the window 372 to interface with the fixed terminals 310, 312.

Figure 10:
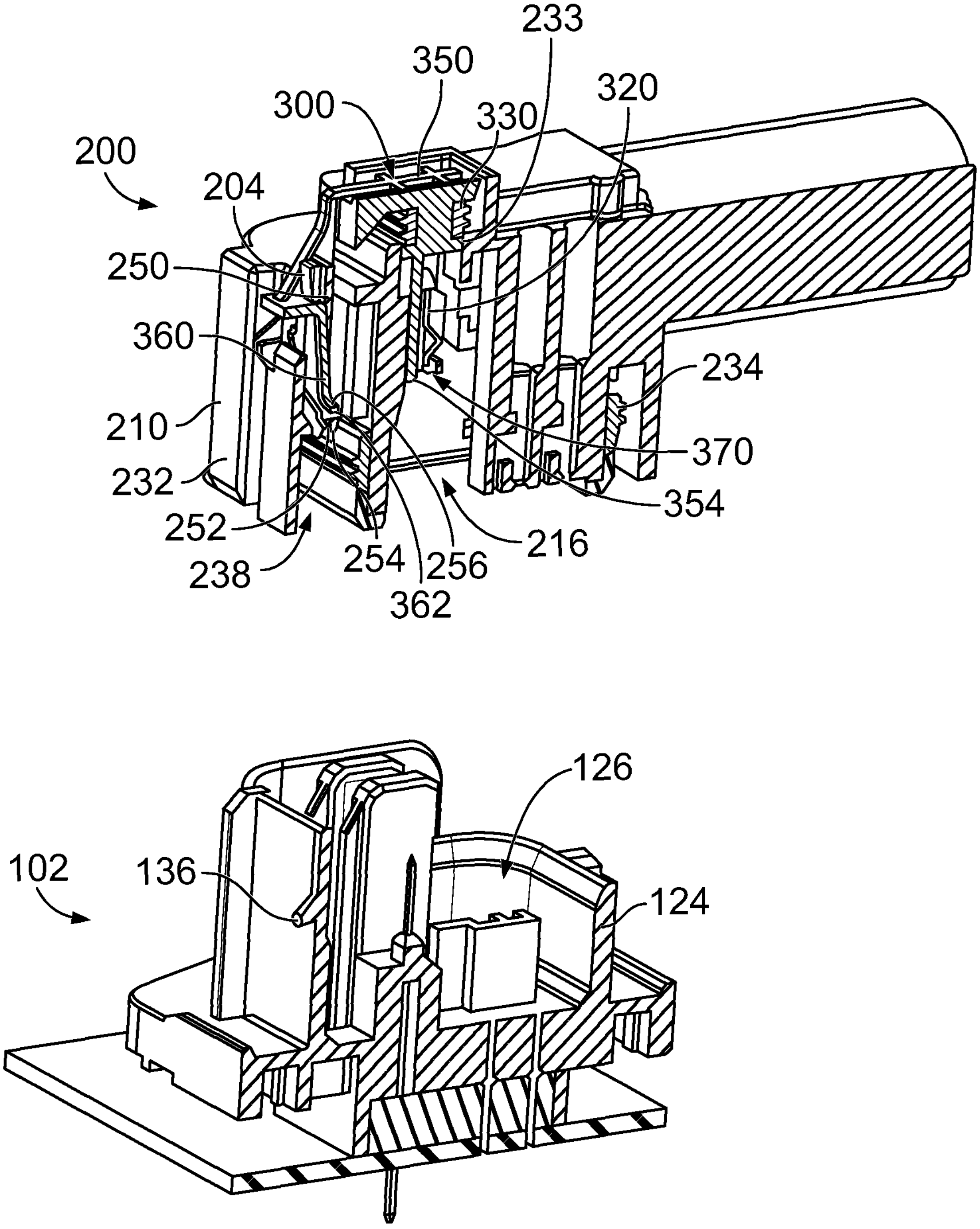
FIG. 10 is a cross-sectional view of a portion of the plug connector in accordance with an exemplary embodiment.

FIG. 10 is a cross-sectional view of the electrical connector system 100 showing a portion of the plug connector 200 and a portion of the header connector 102 in accordance with an exemplary embodiment. The plug connector 200 is mated to the header connector 102 from above. A portion of the plug connector 200 is configured to be plugged into the shroud chamber 126 of the shroud 124. The environmental seal 234 is configured to be sealed to the shroud 124. The latch 204 is used to latchably couple the plug connector 200 to the header connector 102, such as to the latching feature 136.

The actuator 350 and the shorting terminal 320 of the eCPA assembly 300 are coupled to the plug housing 210. The actuator 350 is movably coupled to the plug housing 210 and movable between a retracted position (FIG. 10) and an actuated position. The actuator 350 interacts with the latch 204. In an exemplary embodiment, the actuator 350 is configured to interface with the latch 204 in both the retracted position and the actuated position. For example, the blocking arm 360 is configured to interface with the latch 204. In an exemplary embodiment, both the latch 204 and the blocking arm 360 are located in the latch pocket 238. The stuffer 354 of the actuator 350 is received in an opening 233 in the outer wall 232 and extends into the cavity 216. The seal 330 surrounds the stuffer 354 and engages the plug housing 210 in the opening 233. The shorting terminal 320 is located in the pocket 370 and positioned in the cavity 216.

In an exemplary embodiment, the latch 204 includes a latch arm 250 and a latching beam 252. The latching beam 252 includes a tip 254 and a catch surface 256. The catch surface 256 is configured to engage the latching feature 136 to latchably secure the plug connector 200 to the header connector 102. When assembled, the blocking arm 360 is configured to interface with the latching beam 252. When the actuator 350 is in the retracted position (FIG. 10), the distal end 362 of the blocking arm 360 engages the latching beam 252. The latching beam 252 prevents the actuator 350 from moving forward to the actuated position.

Figure 11:
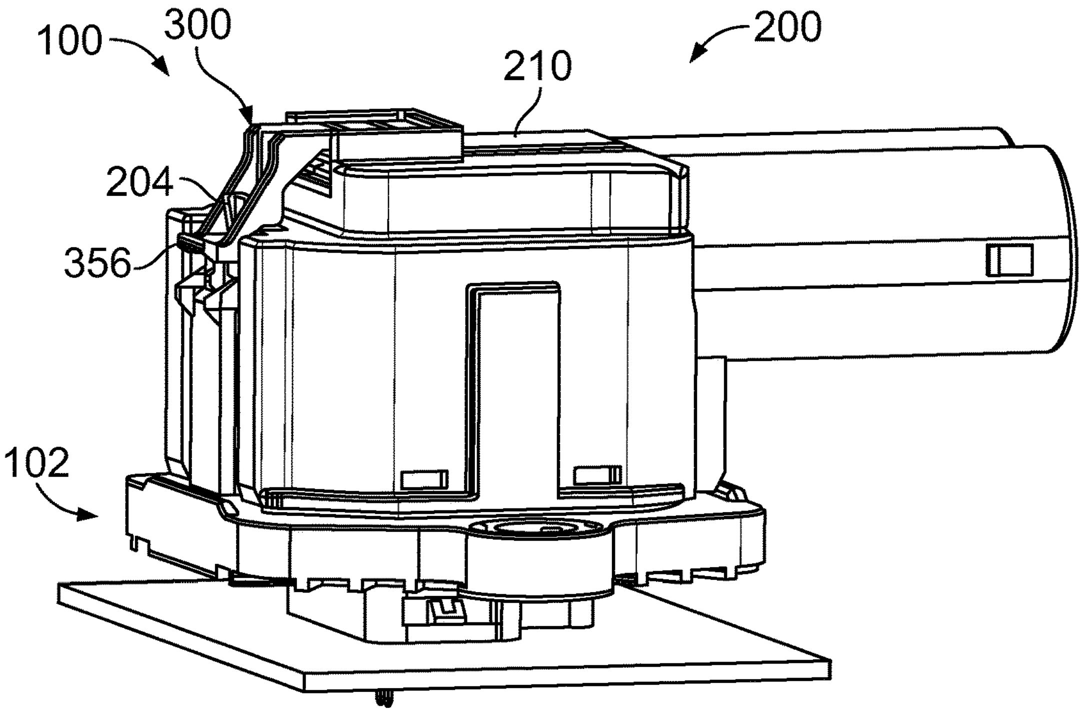
FIG. 11 is a perspective view of the electrical connector system in accordance with an exemplary embodiment showing the plug connector coupled to the header connector.
Figure 12:
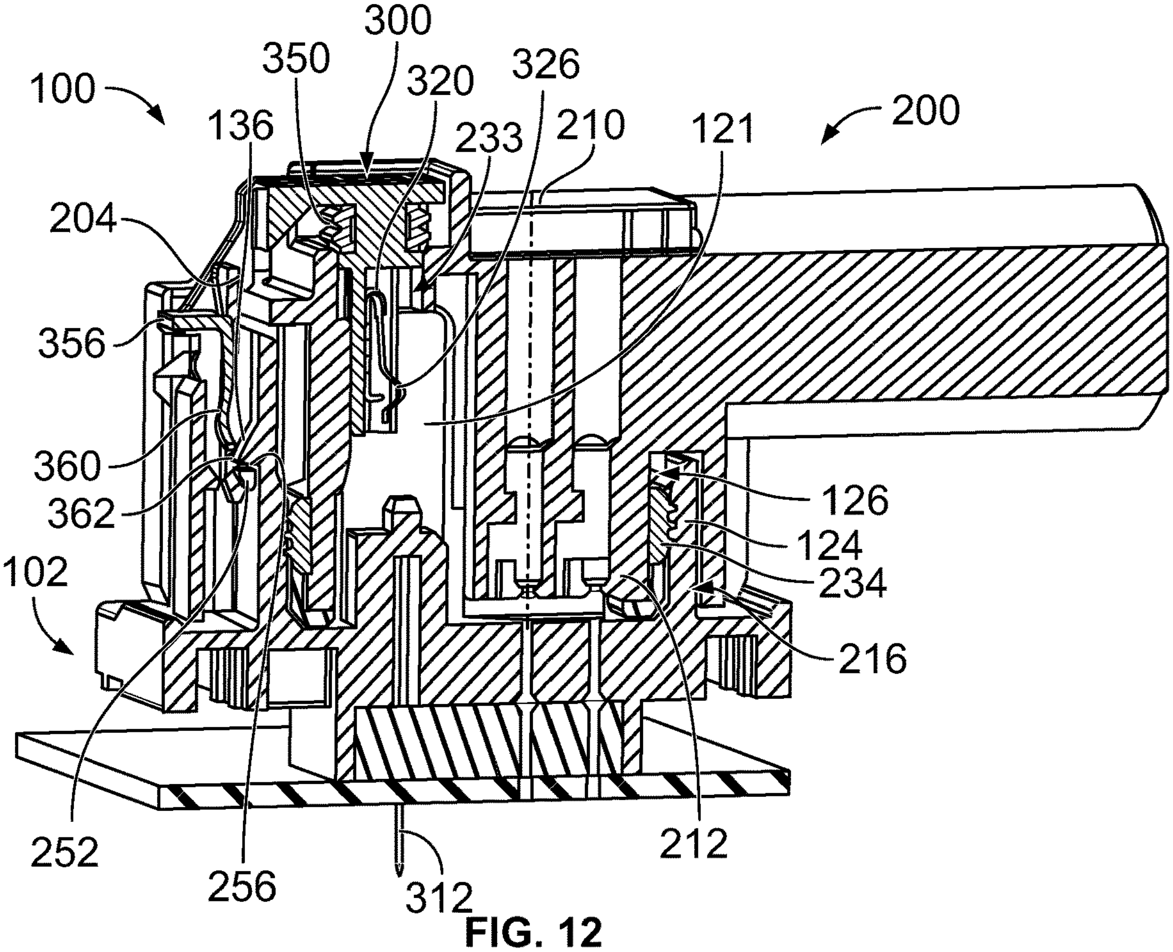
FIG. 12 is a cross-sectional view of a portion of the electrical connector system in accordance with an exemplary embodiment showing the plug connector coupled to the header connector.
Figure 13:
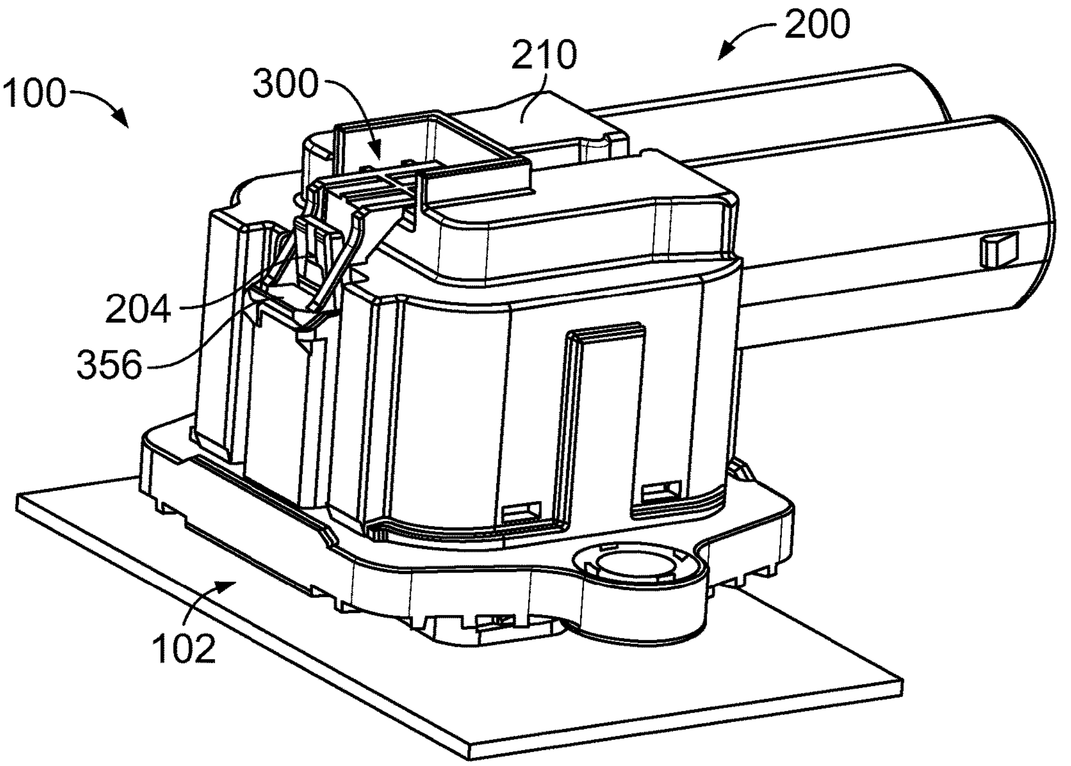
FIG. 13 is a perspective view of the electrical connector system in accordance with an exemplary embodiment showing the plug connector coupled to the header connector.
Figure 14:
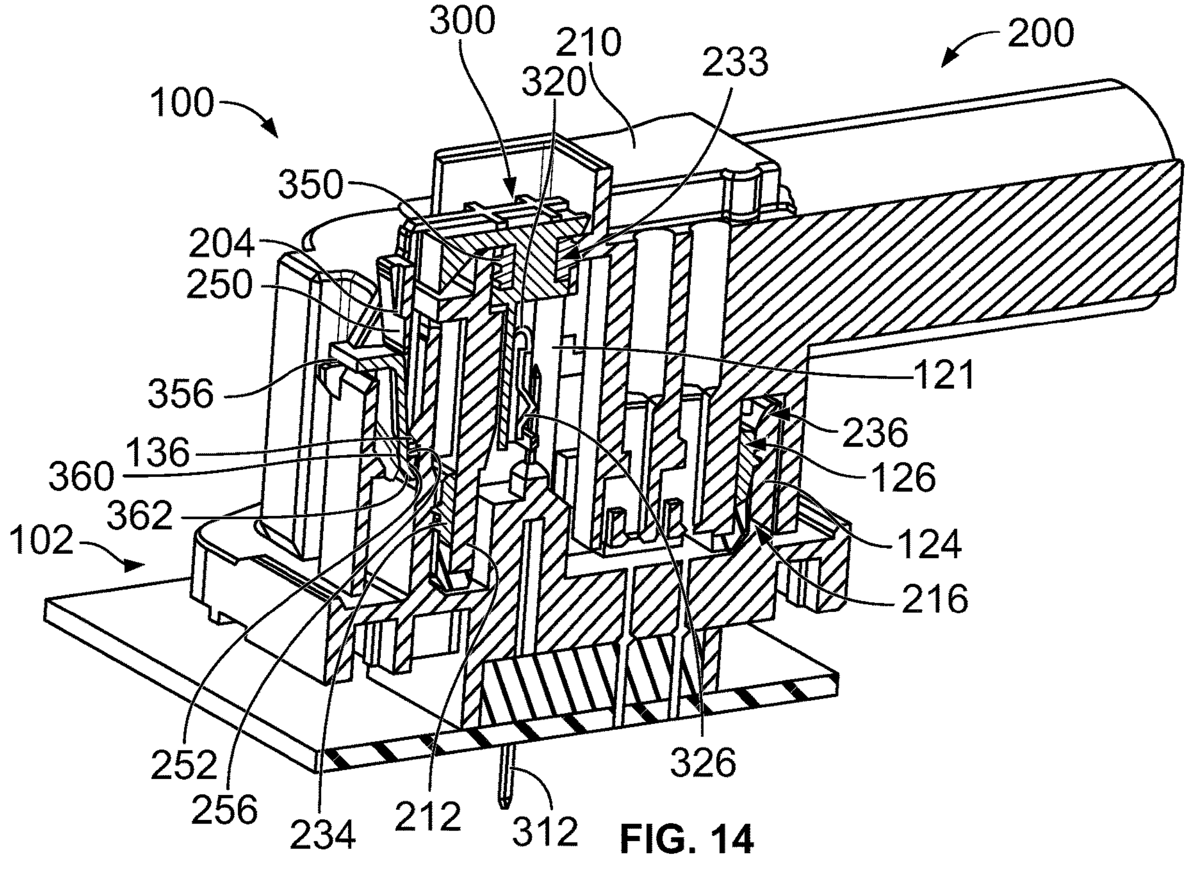
FIG. 14 is a cross-sectional view of a portion of the electrical connector system in accordance with an exemplary embodiment showing the plug connector coupled to the header connector.

FIG. 11 is a perspective view of the electrical connector system 100 in accordance with an exemplary embodiment showing the plug connector 200 coupled to the header connector 102. FIG. 12 is a cross-sectional view of a portion of the electrical connector system 100 in accordance with an exemplary embodiment showing the plug connector 200 coupled to the header connector 102. FIG. 13 is a perspective view of the electrical connector system 100 in accordance with an exemplary embodiment showing the plug connector 200 coupled to the header connector 102. FIG. 14 is a cross-sectional view of a portion of the electrical connector system 100 in accordance with an exemplary embodiment showing the plug connector 200 coupled to the header connector 102. FIGS. 11 and 12 illustrate the eCPA assembly 300 in a retracted position. The eCPA assembly 300 is in an open state (for example, the position assurance circuit is open) in the retracted position. FIGS. 13 and 14 illustrate the eCPA assembly 300 in an advanced position. The eCPA assembly 300 is in a closed state (for example, the position assurance circuit is closed) in the advanced position.

During mating, the plug connector 200 is aligned with the header connector 102. The plug insert 212 is loaded into the shroud chamber 126. The header insert 121, which is located in the shroud chamber 126, is received in the cavity 216. The header contacts 140 (shown in FIG. 5), which are held by the header insert 121, are coupled to the plug contacts 214 (shown in FIG. 4). When mated, the plug housing 210 surrounds the exterior of the shroud 124. For example, the edge of the shroud 124 is received in the seal pocket 236 to interface with the environmental seal 234 to provide a sealed interface between the plug connector 200 and the header connector 102.

When mated, the latch 204 of the plug connector 200 is coupled to the latching feature 136 of the header connector 102. For example, the latching feature 136 is configured to be latchably coupled to the catch surface 256 of the latching beam 252. The latch arm 250 is deflectable and may be pressed to move the latch 204 from a latched position (engaged with the catch surface 256) to an unlatched position (disengaged from the catch surface 256). When the eCPA assembly 300 is in the retracted position (FIGS. 11 and 12), the latch 204 is freely movable between the latched position and the unlatched position.

The eCPA assembly 300 is movably coupled to the plug housing 210. The eCPA assembly 300 is movable from the retracted position (FIGS. 11 and 12) to the actuated position (FIGS. 13 and 14). The eCPA assembly 300 may be moved to the actuated position by pushing downward on the handle 356. In the retracted position, the shorting terminal 320 is not mated to the fixed terminals 310, 312. The eCPA assembly 300 is in an open state (for example, the position assurance circuit is open). However, in the actuated position, the shorting terminal 320 is mated to the fixed terminals 310, 312. The eCPA assembly 300 is in a closed state (for example, the position assurance circuit is closed). The mating arms 324, 326 are electrically connected to the fixed terminals 310, 312 to complete or close the position assurance circuit. The eCPA assembly 300 guarantees that the plug connector 200 is fully mated with the header connector 102 because the position assurance circuit is only closed after the connectors are fully mated. The plug connector 200 can only be unmated from the header connector 102 after the eCPA assembly 300 is moved to the retracted position, thus opening the position assurance circuit, and then unlatching the latch 204 and unmating the plug connector 200 from the header connector 102.

In an exemplary embodiment, the blocking arm 360 is movable relative to the latching beam 252 when the blocking arm 360 is deflected forward, such as by the latching feature 136. The latching feature 136 deflects the blocking arm 360 forward when the latching feature 136 is aligned with the distal end 362 (for example, when the latch 204 is latchably coupled to the latching feature 136. Such deflection offsets the distal end 362 relative to the latching beam 252, which frees the eCPA assembly 300 to move to the actuated position. When the eCPA assembly 300 is in the actuated position (FIGS. 13 and 14), the blocking arm 360 extends along the latching beam 252 and blocks movement of the latching beam 252, and thus the latch 204. The blocking arm 360 blocks the latch 204 from moving from the latched position to the unlatched position. As such, the eCPA assembly 300, in the advanced position, operates as a locking device used to lock the plug connector 200 in the latched position. The eCPA assembly 300 is only movable to the actuated position when the latch 204 is in the latched position (for example, prior to being latched, the distal end 362 of the blocking arm 360 is blocked from moving to the actuated position by the latching beam 252). As such, the eCPA assembly 300 is used as an indication to the operator that the plug connector 200 is fully mated and latched.

In an exemplary embodiment, the seal 330 of the eCPA assembly 300 is sealed to the plug housing 210. In an exemplary embodiment, the seal 330 is movable within the opening 233 as the actuator 350 is moved from the retracted position to the actuated position. The seal 330 is provided at the opening 233 to provide a sealed environment for the eCPA assembly 300. The seal 330 is used to provide an environmental seal for the shroud chamber 126 and the contacts within the shroud chamber 126.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A plug connector comprising:

a plug housing extending between a front and a rear of the plug housing, the plug housing including a cavity, the plug housing configured to be coupled to a header connector, the plug housing having a mating end configured to be plugged into a header chamber of the header connector;

plug contacts held by the plug housing, the plug contacts configured to be mated with corresponding header contacts of the header connector; and an electrical connector position assurance (eCPA) assembly coupled to the plug housing, the eCPA including an actuator movably coupled to the plug housing, the actuator movable between a retracted position and an actuated position, the eCPA including a shorting terminal coupled to the actuator and movable by the actuator between a mated position and an unmated position, the shorting terminal including a first interface configured to be coupled to a first fixed terminal in the mated position and a second interface configured to be coupled to a second fixed terminal in the mated position, the shorting terminal being movable between the unmated position and the mated position as the actuator moves between the retracted position and the actuated position, the shorting terminal forming a position assurance circuit in the mated position when the first and second interfaces are coupled to the first and second fixed terminals.

2. The plug connector of claim 1, wherein the actuator is blocked from moving to the actuated position until the plug housing is coupled to the header connector.

3. The plug connector of claim 1, wherein the actuator includes a main body and a blocking arm extending from the main body, the blocking arm movable between a clearance position and a blocking position as the actuator is moved from the retracted position to the actuated position, the blocking arm blocking movement of a latch of the plug housing used to latchably couple the plug housing to the header connector when the blocking arm is in the blocking position, the latch being movable without obstruction by the blocking arm when the blocking arm is in the clearance position.

4. The plug connector of claim 3, wherein the shorting terminal is in the mated position only when the blocking arm is in the blocking position.

5. The plug connector of claim 3, wherein the blocking arm is movable between the blocking position and the clearance position only when the plug housing is coupled to the header connector.

6. The plug connector of claim 1, wherein the shorting terminal is in the unmated position when the actuator is in the retracted position and wherein the shorting terminal is in the mated position when the actuator is in the actuated position.

7. The plug connector of claim 1, wherein the shorting terminal includes a base, a first arm extending from the base to a first end, and a second arm extending from the base to a second end, the first end defining the first interface, the second end defining the second interface.

8. The plug connector of claim 1, wherein the eCPA assembly includes a seal coupled to the actuator, the seal providing sealing between the actuator and the plug housing.

9. The plug connector of claim 8, wherein the seal is movable with the actuator.

10. A plug connector comprising:

a plug housing extending between a front and a rear of the plug housing, the plug housing including a cavity, the plug housing configured to be coupled to a header connector, the plug housing having a mating end configured to be plugged into a header chamber of the header connector;

a plug seal coupled to the plug housing, the plug seal configured to interface with the header connector to provide environmental sealing between the plug housing and the header connector;

plug contacts held by the plug housing, the plug contacts configured to be mated with corresponding header contacts of the header connector; and an electrical connector position assurance (eCPA) assembly coupled to the plug housing, the eCPA including an actuator, a shorting terminal, and an eCPA seal, the actuator movably coupled to the plug housing, the actuator movable between a retracted position and an actuated position, the shorting terminal being coupled to the actuator and movable by the actuator between a mated position and an unmated position, the shorting terminal including a first interface configured to be coupled to a first fixed terminal in the mated position and a second interface configured to be coupled to a second fixed terminal in the mated position, the shorting terminal being movable between the unmated position and the mated position as the actuator moves between the retracted position and the actuated position, the shorting terminal forming a position assurance circuit in the mated position when the first and second interfaces are coupled to the first and second fixed terminals, the eCPA seal being coupled to the actuator, the eCPA seal providing sealing between the actuator and the plug housing.

11. The plug connector of claim 10, wherein the actuator is blocked from moving to the actuated position until the plug housing is coupled to the header connector.

12. The plug connector of claim 10, wherein the actuator includes a main body and a blocking arm extending from the main body, the blocking arm movable between a clearance position and a blocking position as the actuator is moved from the retracted position to the actuated position, the blocking arm blocking movement of a latch of the plug housing used to latchably couple the plug housing to the header connector when the blocking arm is in the blocking position, the latch being movable without obstruction by the blocking arm when the blocking arm is in the clearance position.

13. The plug connector of claim 12, wherein the shorting terminal is in the mated position only when the blocking arm is in the blocking position, and wherein the blocking arm is movable between the blocking position and the clearance position only when the plug housing is coupled to the header connector.

14. The plug connector of claim 10, wherein the seal is movable with the actuator.

15. An electrical connector system comprising:

a header connector including a header housing and header contacts held by the header housing, the header housing having a base and a shroud extending from the base, the shroud surrounding a shroud chamber, the header contacts coupled to the base and extending into the shroud chamber;

a plug connector including a plug housing extending between a front and a rear of the plug housing, the plug housing including a cavity, the plug housing having a mating end plugged into the header chamber of the header connector, the plug connector including plug contacts held by the plug housing and extending into the cavity, the plug contacts mated with corresponding header contacts of the header connector;

an electrical connector position assurance (eCPA) assembly operably coupled to the header connector and the plug connector, the eCPA including a first fixed terminal in the shroud chamber and a second fixed terminal in the shroud chamber, the eCPA including an actuator movably coupled to the plug housing, the actuator movable between a retracted position and an actuated position, the eCPA including a shorting terminal coupled to the actuator and movable by the actuator between a mated position and an unmated position, the shorting terminal including a first interface configured to be coupled to the first fixed terminal in the mated position and a second interface configured to be coupled to the second fixed terminal in the mated position, the shorting terminal being movable between the unmated position and the mated position as the actuator moves between the retracted position and the actuated position, the shorting terminal forming a position assurance circuit in the mated position when the first and second interfaces are coupled to the first and second fixed terminals.

16. The electrical connector system of claim 15, wherein the eCPA assembly includes a seal coupled to the actuator, the seal providing sealing between the actuator and the plug housing.

17. The electrical connector system of claim 15, wherein the header connector includes a header insert coupled to the header housing and located in the shroud chamber, the header insert holding the header contacts, the header insert holding the first and second fixed terminals.

18. The electrical connector system of claim 15, further comprising an environmental seal sealing coupled to the plug housing and sealing coupled to the header housing.

19. The electrical connector system of claim 15, wherein the actuator includes a main body and a blocking arm extending from the main body, the blocking arm movable between a clearance position and a blocking position as the actuator is moved from the retracted position to the actuated position, the blocking arm blocking movement of a latch of the plug housing used to latchably couple the plug housing to the header connector when the blocking arm is in the blocking position, the latch being movable without obstruction by the blocking arm when the blocking arm is in the clearance position.

20. The electrical connector system of claim 19, wherein the shorting terminal is in the mated position only when the blocking arm is in the blocking position, and wherein the blocking arm is movable between the blocking position and the clearance position only when the plug housing is coupled to the header connector.

* * * * *